Figure 1:
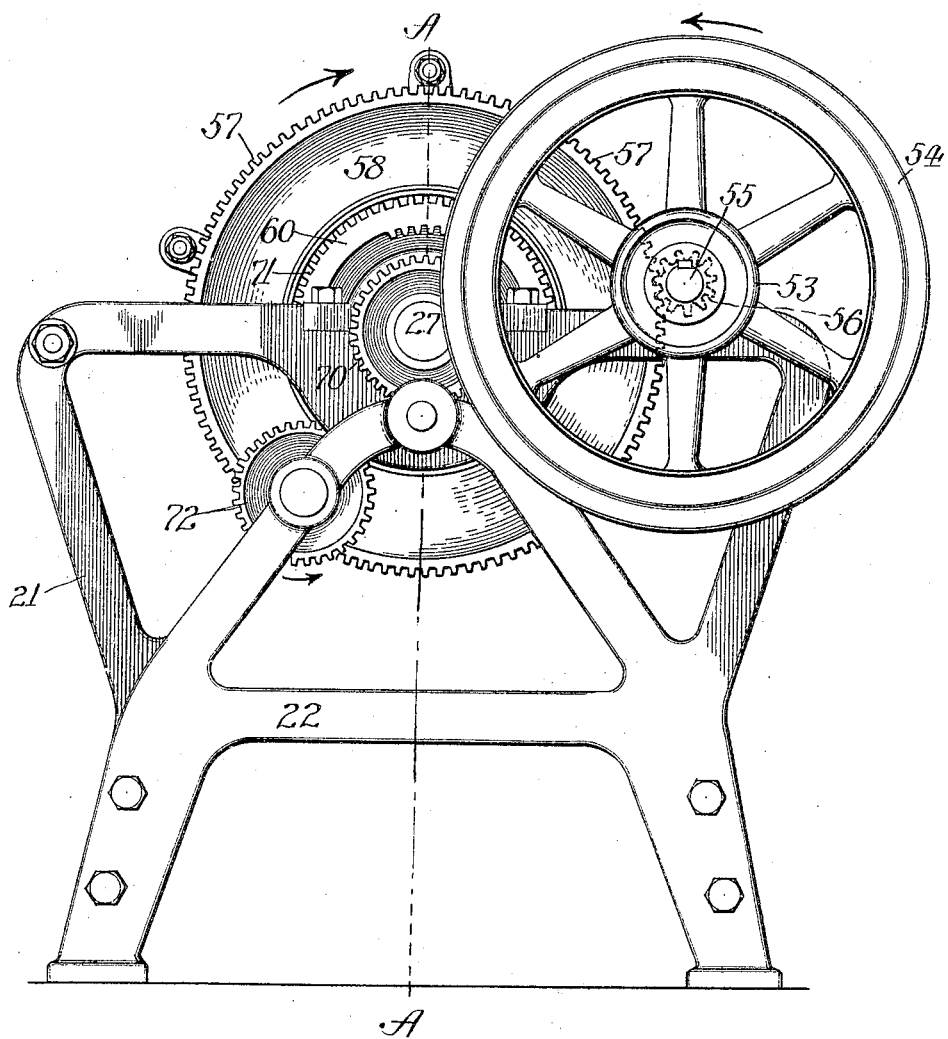

No. 813,126. PATENTED FEB. 20, 1906.
C. WILLIAMS.
MECHANICAL MOVEMENT.
APPLICATION FILED APR. 1, 1903. RENEWED JULY 21, 1905.

6 SHEETS—SHEET 1.

Witnesses:
Harold G. Barrett
E. Molitor

Inventor
Charles Williams
By, Coburn & McRoberts
Atty's.

No. 813,126. PATENTED FEB. 20, 1906.
C. WILLIAMS.
MECHANICAL MOVEMENT.
APPLICATION FILED APR. 1, 1903. RENEWED JULY 21, 1905.
6 SHEETS—SHEET 4.
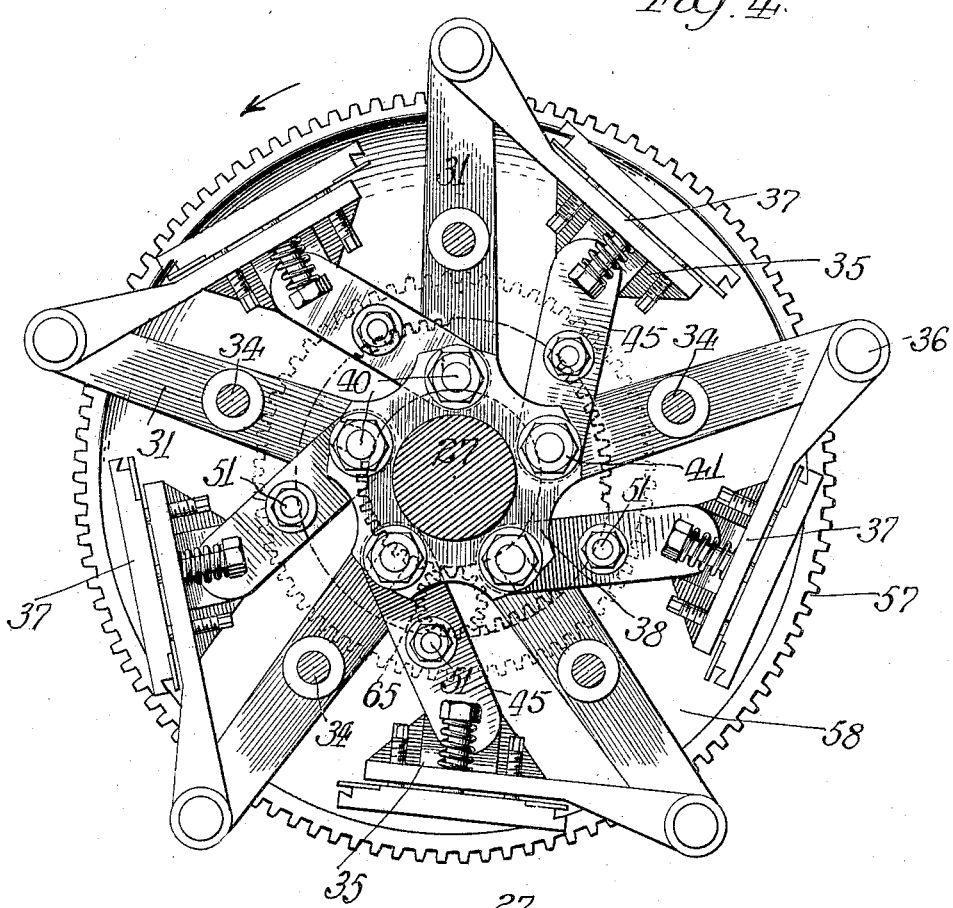
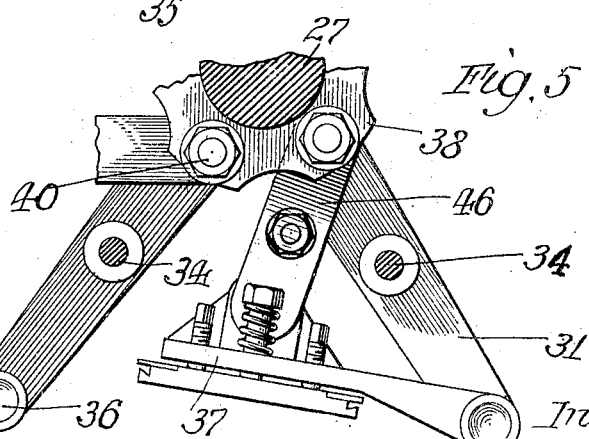
Witnesses:
Harold G. Barrett
E. Molitor
Inventor
Charles Williams
By Coburn & McRoberts
Atty's No. 813,126. PATENTED FEB. 20, 1906.
C. WILLIAMS.
MECHANICAL MOVEMENT.
APPLICATION FILED APR. 1, 1903. RENEWED JULY 21, 1905.
6 SHEETS—SHEET 5.
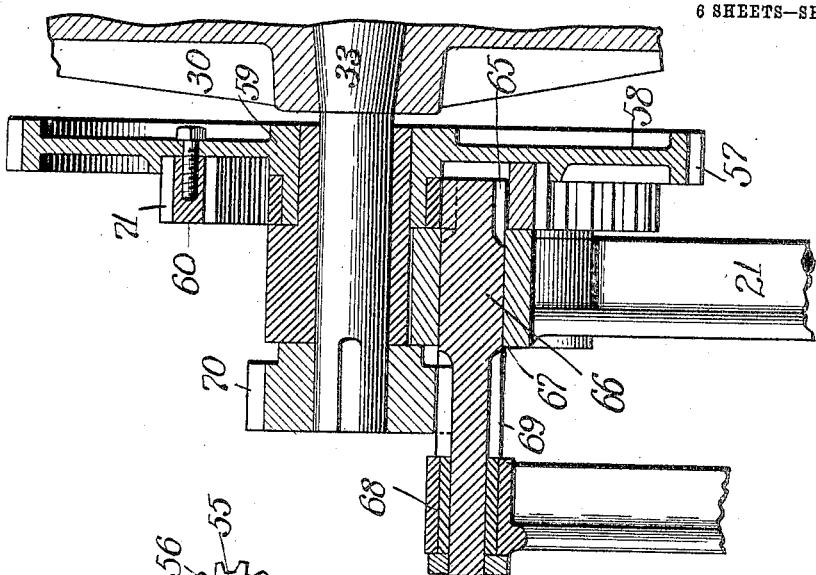
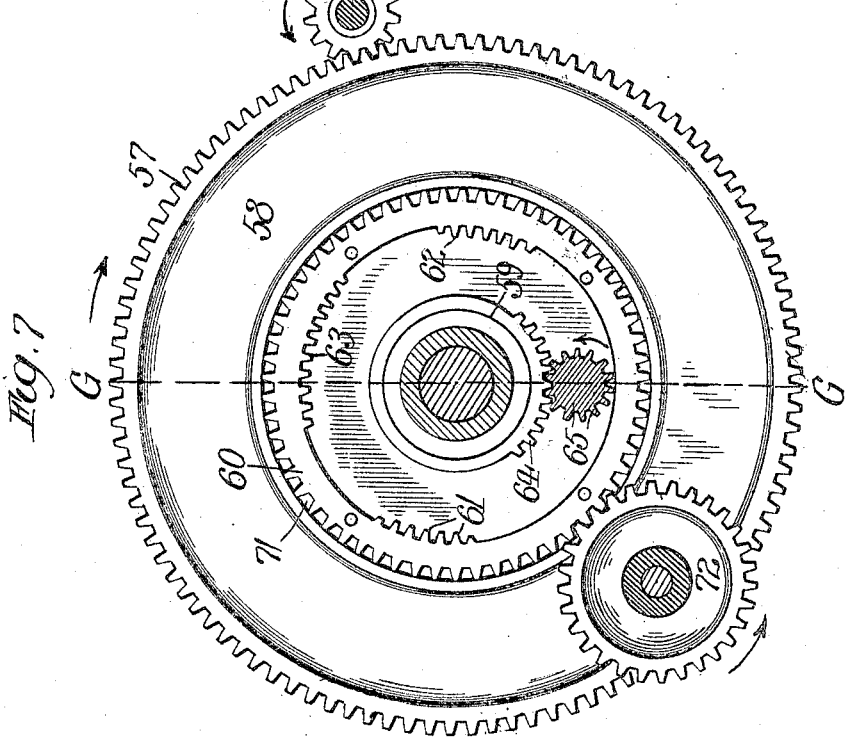

No. 813,126. PATENTED FEB. 20, 1906.
C. WILLIAMS.
MECHANICAL MOVEMENT.
APPLICATION FILED APR. 1, 1903. RENEWED JULY 21, 1905.

6 SHEETS—SHEET 6.

Witnesses
Harold G. Barrett
E. Molitor

Inventor
Charles Williams
By. Oburn & McRoberts
Attys

UNITED STATES PATENT OFFICE.

CHARLES WILLIAMS, OF SPOKANE, WASHINGTON, ASSIGNOR OF FIFTEEN-SIXTEENTHS TO WILLIAM H. COWLES AND JOHN F. YOUNG, OF SPOKANE, WASHINGTON.

MECHANICAL MOVEMENT.

No. 813,126.     Specification of Letters Patent.     Patented Feb. 20, 1906.

Application filed April 1, 1903. Renewed July 21, 1905. Serial No. 270,740.

*To all whom it may concern:*

Be it known that I, CHARLES WILLIAMS, a citizen of the United States, residing at Spokane, in the county of Spokane and State of Washington, have invented certain new and useful Improvements in Mechanical Movements, of which the following is a specification.

My invention is concerned with a novel mechanical movement by which I transform the continuous rotary movement of a shaft in one direction into the intermittent rotary movement of the elements to which the power is finally applied, and between the intermittent rotary movements of said elements I give them a reciprocating movement transverse to the rotation thereof.

I have shown my invention in the form in which I employ it in connection with my multicolor-press, application Serial No. 150,563, filed April 1, 1903, and as mounted in a frame suitable for such a press, although it will be understood that it might be otherwise mounted and differently constructed in some respects.

To illustrate my invention, I annex hereto six sheets of drawings, in which the same reference characters are used to designate identical parts in all the figures, of which—

Figure 2:
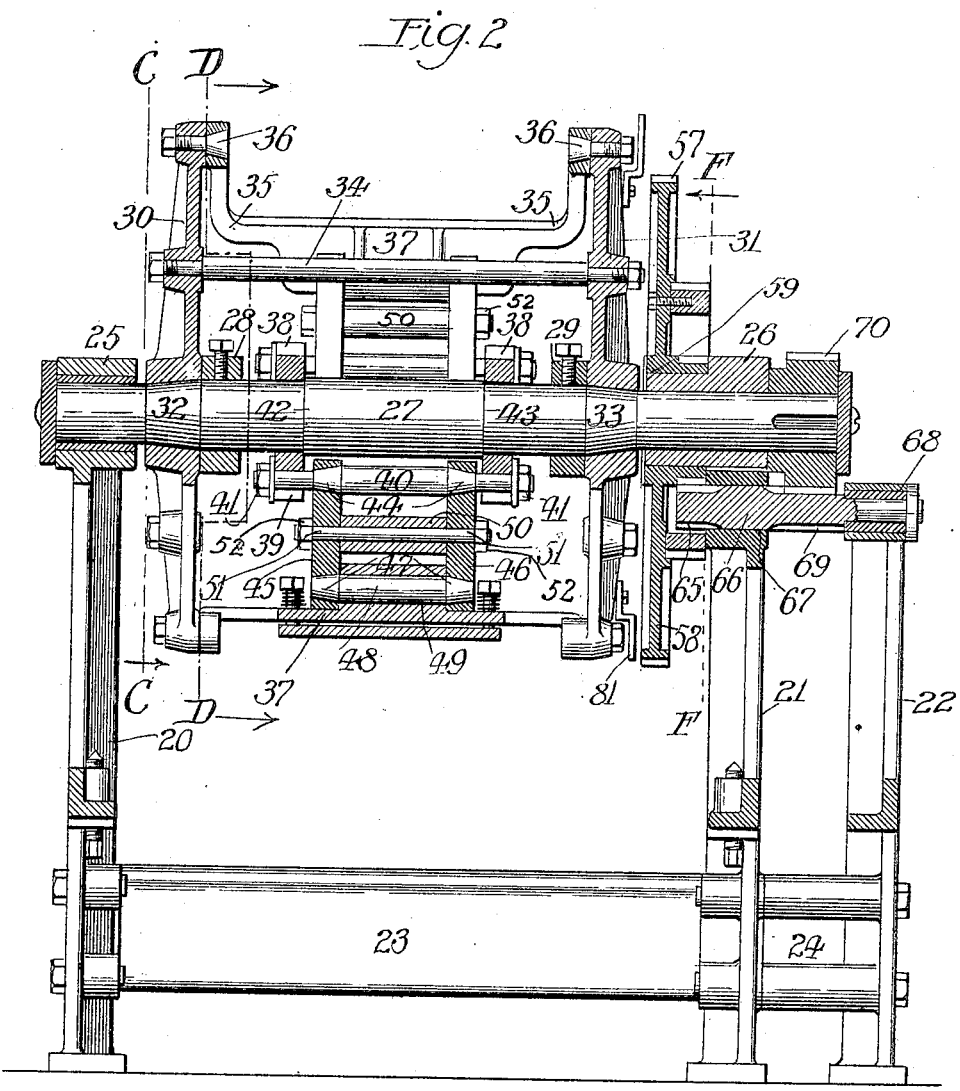
Figure 3:
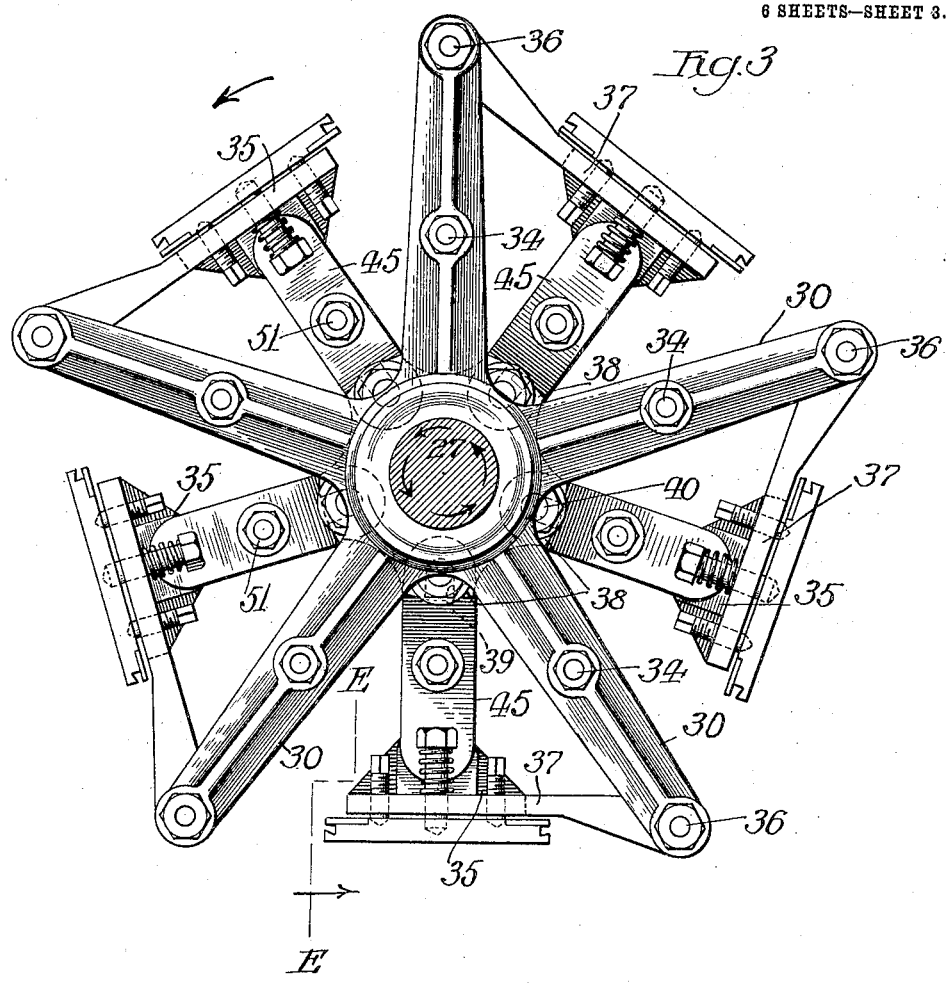
Figure 6:
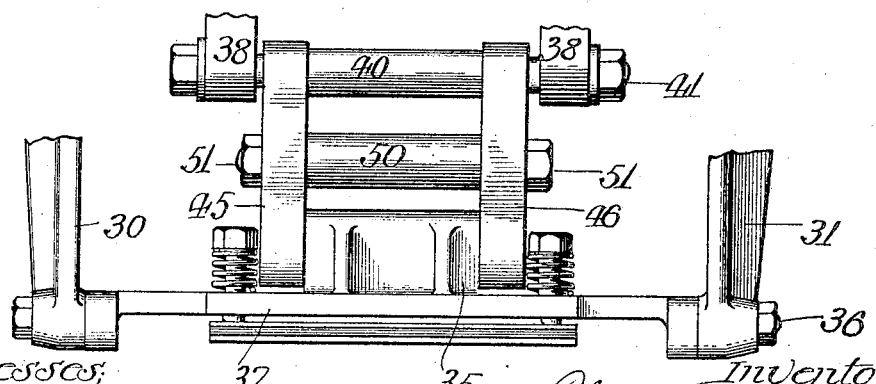
Figure 9:
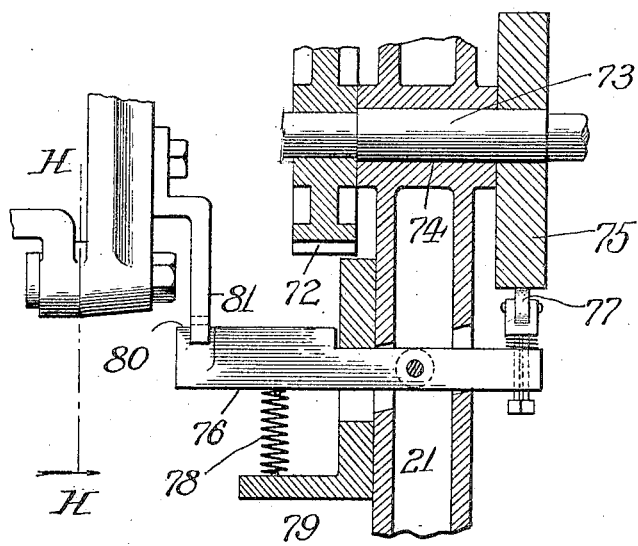
Figure 10:
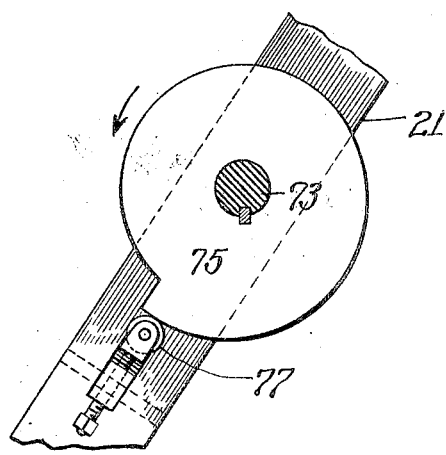
Figure 11:
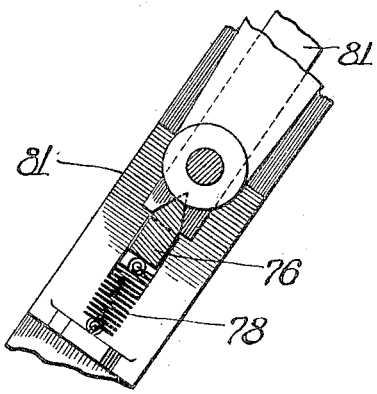

Figure 1 is a side elevation of my movement as mounted in a frame and supplied with a heavy driving-pulley. Fig. 2 is a vertical section of the same substantially on the line A A of Fig. 1. Fig. 3 is a sectional view, on an enlarged scale, on the line C C of Fig. 2. Fig. 4 is a sectional view on the line D D of Fig. 2. Fig. 5 is a fragmentary view of a portion of the mechanism shown in Fig. 4, but with the parts in a slightly different relative position. Fig. 6 is a side elevation of a portion of the mechanism shown in Fig. 3 as seen from the line E E of said figure. Fig. 7 is a detail in section on the line F F of Fig. 2. Fig. 8 is a sectional view on the line G G of Fig. 7. Fig. 9 is a sectional detail showing the construction of the locking mechanism employed in my movement. Fig. 10 is a side elevation of the same as seen from the right of Fig. 9, and Fig. 11 is a detail of the same in section on the line H H of Fig. 9.

To furnish a suitable support for my novel movement, I have shown the framework consisting of the three standards 20, 21, and 22. They are spaced apart at the bottom of the machine by the transverse pieces 23, extending between the standards 20 and 21, and by the projections or sleeves 24, which unite the standards 21 and 22 and which may be integral with the latter standard. Journaled in the bearings 25 and 26, formed in the tops of the standards 20 and 21, respectively, is the shaft 27, which has frictionally mounted thereon a suitable frame consisting in the embodiment of the invention illustrated of a pair of spiders 30 and 31, spaced apart on the shaft by collars 28 and 29. The shaft 27 has a certain amount of movement independent of the frame provided by the spiders 30 and 31, and as a means of securing an accurate and easily-adjusted alinement I may taper the shaft 27 at the bearing portions 32 and 33, with which the complementarily-shaped inner bearing-surfaces of the hubs of the spiders coöperate.

As will be best seen from Fig. 3, the spiders 30 and 31 have five equidistant and symmetrical arms, each opposite pair of which is connected by a rod or bar 34, furnished with the shoulders and nuts, as clearly shown in Fig. 2. In addition to these rigid cross-bars 34 I employ the swinging yoke-shaped members 35, which carry the members to which the movement imparted to the mechanism is finally applied. Where the movement is applied to a multicolor-press, the members 35 will be provided with platens. These swinging yoke-shaped members are preferably journaled on conical bearing-studs 36, as shown, and the enlarged central portion 37, which is the effective part of the member, will be seen to be disposed about half-way between the arms to which it is attached and the adjacent arms.

Fixed onto the shaft 27 inside of the collars 28 and 29 are the bearing plates or disks 38, which have the five equidistant and symmetrical recesses 39 in the periphery thereof to receive the bearing-rods 40, which are rigidly secured in place between said collars by the nuts 41 at their ends. To assist in spacing the collars 38, I preferably form the oppositely-directed shoulders 42 and 43 on the shaft 27, against which the collars 38 abut and where they are held by the bolt or bearing-rods 40. The bearing-rods 40 are provided with the oppositely-directed conical bearing-surfaces 44, facing outward, with which coöperate the complementary bearing-apertures in the pairs of bars or links 45 and 46, which are also provided at their other ends with bearing-rods 48, having oppositely-directed conical bearing-surfaces 47 formed on the ends thereof, which coöperate with the complementarily-shaped bearing-recesses in the links or bars 45 and 46. Each rod 48 is supported and rocks in a bearing 49, projecting upwardly from one of the members 37, (when in its lowermost position,) so that if the parts be in the position shown in Fig. 4 and the shaft 27 is rocked so as to carry the bars or links 45 and 46 to the radial position shown in Fig. 3, the five toggle-joints formed by the mechanisms described will be straightened out so as to move the members 37 outward and transversely to their line of movement, when the parts are translated without changing their relative positions.

In order to space the links 45 and 46 apart the proper distance, so that the proper amount of friction and freedom of movement will be allowed between the conical bearings 44 and 47 and the links 45 and 46, I interpose between said links a sleeve 50, through which and coöperating apertures in the links 45 and 46 the clamping-bolt 51 passes, so that by tightening the nuts 52 on the end of said bolt the links 45 and 46 will be spaced apart the proper distance.

It will be apparent that the relative movement of the parts designed may be obtained without the elaborate details of construction above described.

Referring now to Figs. 3 to 5, the relative movements of the mechanism so far described will be apparent. In Fig. 3 it will be apparent that the members 37 are all in their extreme outermost positions, the toggles being straightened. If now the spiders be locked from movement and the shaft 27 is rotated in either direction, the members 37 will be withdrawn, owing to the fact that thereby the toggle is broken. In Fig. 4 is seen the result of thus rotating the shaft 27 clockwise from the position shown in Fig. 3, while in Fig. 5 the effects of rotating the shaft in the opposite direction are seen, the effects on the movement of the members 37 in both instances being identical. If now with the members 37 retracted and the parts in the position shown in Fig. 4 the spiders be unlocked, so that they are free to move with the shaft 27 and the shaft be moved forward or clockwise through an angle of seventy-two degrees, the relative position of the parts shown in Fig. 4 will not be changed, although each member 37 will have advanced to another position, so as to be opposite some other stationary member with which it coöperates—such, for instance, as the type-form in a printing-press, in which case the member 37 would represent the platen. To now throw the members 37 outward, it is necessary to lock the spiders from rotation and to rotate the shaft 27 backward, which will bring the parts to the position shown in the fragmentary view of Fig. 5, the limit of the outward movement of the member 37 having been reached when half the movement was completed, the remainder of the movement being devoted to its retraction. The spiders are now unlocked, and the shaft 27 is rotated forward—i. e., clockwise—through a space of seventy-two degrees, carrying with it all the parts in the position shown in Fig. 5. At the end of the seventy-two-degree movement the spiders are again locked, and in order to throw the members 37 outward again to coöperate with their associated elements in the new position it is necessary to rotate the shaft 27 forward again, during which rotation each member 37 is forced outward and withdrawn, leaving the parts again in the position shown in Fig. 4. From a careful consideration of this mode of operation of the movement it will be apparent that it is necessary, starting with the parts in the position shown in Fig. 4, in which it is assumed that the elements 37 have been thrust out and returned, to first advance the shaft and the spiders seventy-two degrees; second, to reverse the shaft while the spiders are locked to throw out and return the elements 37; third, to advance the shaft seventy-two degrees with the spiders unlocked to bring the parts to a fresh position, and, fourth, to advance the shaft 27 with the spiders locked as far as it was reversed during the second movement to throw out and return the members 37, which completes the cycle of movements. In order to produce this novel movement of the parts, I employ the mechanism now to be described.

Referring now to Figs. 1, 2, 7, and 8, it will be seen that I apply power through means of a belt-wheel 53, which is preferably secured to a fly-wheel 54, both of which are secured to a shaft 55, mounted to rotate in a bearing formed in the framework and carrying on its inner end a gear-pinion 56. This pinion 56 meshes with the peripheral gear-teeth 57 of a wheel or disk 58, which will thus be seen to be in continual rotation. This disk 58 is loosely mounted, by means of the hub 59, on the bearing formed on the outer side and inner end of the bearing 26 for one end of the shaft 27. The disk 58 is provided on its face with an annulus 60, which has at one point of its inner surface the seven gear-teeth 61 and substantially diametrically opposite thereto a similar number of gear-teeth 62. Midway between these two sets of gear-teeth on one side is another set 63, which, however, has eleven gear-teeth instead of seven. The hub 59 of the wheel or disk 58 is provided with the mutilated gear 64, whose eleven teeth are substantially diametrically opposite to the teeth 63 on the flange 60. These sets of gear-teeth 61, 62, and 63 are adapted to mesh with a gear-pinion 65 on the under side thereof and rotate it three times in succession, giving it a greater rotation during the intermediate ones than during the two end ones. The gear-teeth 64 engaging it at the upper side give it a rotation in the opposite direction to the same extent as that of the intermediate rotation by the teeth 63. The pinion 65 is formed on the inner end of the horizontal shaft 66, mounted to rotate in the bearings 67 and 68, formed in the upper parts of the frames 21 and 22. The pinion 65 has fourteen teeth thereon, and between the bearings 67 and 68 is formed another pinion 69, having twenty teeth thereon and meshing with the gear-pinion 70, splined on the end of the shaft 27 and having fifty teeth. From a consideration of these ratios it will be apparent that when the teeth 61 and 62, seven each, engage the pinion 65 they will rotate it one hundred and eighty degrees in one direction and that as the gear-pinion 69 has twenty teeth and the gear-pinion 70 fifty teeth these one hundred and eighty degrees of movement of the pinion 65 will serve to advance the pinion 70 through ten of its teeth, or seventy-two degrees, which will be remembered is the amount that the shaft 27 and the spiders must be advanced at every other movement of the shaft 27. By reference to Fig. 7 it will be apparent that when the pinion 65 is engaged by the teeth 61, 62, or 63 it cannot be in engagement with the teeth 64, so that the shaft 27 is rotated in the opposite direction independently of the disk 58 and at a different rate of movement. When the teeth 64 are in engagement with the pinion 65, it will be apparent that while the disk 58 is rotating independently of and at a different rate of speed from the shaft 27 it is rotating in the same direction.

Referring now to Figs. 3, 4, 5, and 7, the sequence of movements of the parts can now be readily seen. With the parts in the position shown in Fig. 3 the gear mechanism is at the same time in the position shown in Fig. 7, the members 37 being thrust out and ready to return by the reverse movement of the shaft 27, caused by the engagement of the teeth 64 with the pinion 65. When the disk 58 has advanced clockwise a sufficient distance to free the pinion 65 from the teeth 64, the members 37 have been retracted and the parts are in the position shown in Fig. 5. As the teeth 62 engage the pinion 65 from the opposite side the spiders are unlocked, and the platens and shaft are advanced through seventy-two degrees to the new position. The parts are still in the relative position shown in Fig. 5. The teeth 63 now engage the pinion 65, the spiders being locked, and cause the printing to be effected and the parts to be moved from the position shown in Fig. 5 to that shown in Fig. 4. The amount of angular movement given to the shaft 27 during these inward and outward movements of the members 37 is about one hundred and twelve degrees, more angular movement of the shaft 27 being required for this movement than for the advancing of the mechanism as a whole. The amount of the alternate backward or forward movements of the shaft is of course always equal. The teeth 61 now engage the pinion 65, and the spiders being unlocked the whole mechanism is advanced through the seventy-two degrees to the fresh point, the parts being in the position shown in Fig. 4. The teeth 64 now engaging the pinion 65 on the opposite side, the spiders being locked, forces the members 37 outward and inward, the backward movement of the shaft 27 thus changing the position of the parts from that shown in Fig. 4 to Fig. 5.

Mechanism for locking and unlocking the spiders at the proper time will next be explained, reference being had especially to Figs. 8 and 9 to 11. The flange 60 has on its outer periphery a set of gear-teeth 71, twice the number of the gear-teeth constituting the periphery of the gear-wheel 72, with which it meshes. This gear-wheel is secured upon the inner end of a shaft 73, mounted in the bearing 74, formed in the standard 21. Secured on the outer end of this shaft 73 is a cam-disk 75, which has frictional engagement with the end of the locking-lever 76, preferably through the antifriction-roller 77, yieldingly mounted in the outer end of said locking-lever. A helically-coiled contractile spring 78, secured on the under side of the lever 76 and to a bracket 79, serves to hold the inner end of the lever down, so that its outer end, carrying the roller 77, will be kept in engagement with the cam-disk. This lever 76 is pivotally mounted in the standard 21, passing through apertures formed therein. The locking edge 80 of said lever coöperates once every revolution of the disk 72 or twice every revolution of the disk 58, which corresponds to the cycle of movement of the mechanism, with a yoke 81 rigidly secured on the outer ends by the arms of the spiders 31 in suitable position to lock them from movement, as is necessary in the operation of the mechanism above described.

It will be apparent that (except for the design of the cam 75 shown) the disk 58 may be driven in either direction and the desired sequence of movements obtained, although with the particular design of cam 75 shown it must always rotate in the direction indicated by the arrows adjacent thereto on the different figures. In the description the word "forward" has been employed to indicate a clockwise movement, as appears from the position of the figure under description. As seen from Fig. 1, the disk 58 rotates forward continuously, while the shaft 27 has a cycle of three backward and one forward movements. In the claims, however, I have described the general direction of movement of the shaft 27 (the direction of the three movements) as "forward," while the single movement is "backward."

While I have shown and described my apparatus as embodied in the form which I at present consider best adapted to carry out its purposes, it will be understood that it is capable of some modifications and that I do not desire to be limited in the interpretation of the following claims except as may be necessitated by the state of the prior art.

What I claim as new, and desire to secure by Letters Patent of the United States, is—

1. In a mechanical movement, the combination with a shaft mounted to rotate in bearings, of a frame mounted frictionally thereon, means for locking said frame at intervals to prevent its movement with the shaft, a member movably secured to said frame, a toggle-joint connection between said shaft and said member; the parts being so arranged and constructed that three forward movements of the shaft, the frame being locked from movement during the two extreme forward movements, and a reverse movement of said shaft, will cause the member first, to be advanced to a new position; second, to be moved outward and returned; third, to be advanced to another new position; and fourth, to be moved outward and returned, and means for imparting such movement to the shaft.

2. In a mechanical movement, the combination with a shaft mounted in suitable bearings, of a pair of arms frictionally mounted thereon, means for locking these arms from movement at each position of adjustment, a member pivotally mounted between the outer ends of these arms, and toggle-joint mechanism between said shaft and said member, the parts being arranged and constructed to operate as described.

3. In a mechanical movement, the combination with a shaft mounted in suitable bearings, of a pair of arms frictionally mounted thereon, means for locking these arms from movement at each position of adjustment, a member pivotally mounted between the outer ends of these arms, and toggle-joint mechanism between said shaft and said member, said connections consisting of a pair of disks secured on the shaft to which and to the member are pivoted a pair of links, the parts being arranged and constructed to operate as described.

4. In a mechanical movement, the combination with a shaft mounted to rotate in bearings, of arms mounted frictionally thereon, means for locking said arms at intervals to prevent their movement with the shaft, a member movably secured to the outer end of said arms, and toggle-joint connections between said shaft and said member; the parts being so arranged and constructed that three forward movements of the shaft, the arms being locked from movement during the two extreme forward movements, and a reverse movement of said shaft, will cause the member first, to be advanced to a new position; second, to be moved outward and returned; third, to be advanced to another new position; and fourth, to be moved outward and returned, and means for imparting such movement to said shaft.

5. In a mechanical movement, the combination with a shaft mounted to rotate in bearings, of arms mounted frictionally thereon, means for locking said arms at intervals to prevent their movement with the shaft, a member movably secured to the outer end of said arms, and toggle-joint connections between said shaft and said member; the parts being so arranged and constructed that three forward movements of the shaft, the arms being locked from movement during the two extreme forward movements, and a reverse movement of said shaft, will cause the member first, to be advanced to a new position; second, to be moved outward and returned; third, to be advanced to another new position; and fourth, to be moved outward and returned, and means for imparting such movement to said shaft consisting of a pinion and a gear member having three sets of teeth adapted to engage with one side of said pinion ultimately connected to said shaft and another set of teeth adapted to engage with the other side of said pinion.

6. In a mechanical movement, the combination with a shaft mounted to rotate in bearings, of arms mounted frictionally thereon, means for locking said arms at intervals to prevent their movement with the shaft, a member movably secured to the outer end of said arms, and toggle-joint connections between said shaft and said member; the parts being so arranged and constructed that three forward movements of the shaft, the arms being locked from movement during the two extreme forward movements, and a reverse movement of said shaft, will cause the member first, to be advanced to a new position; second, to be moved outward and returned; third, to be advanced to another new position; and fourth, to be moved outward and returned; and means for imparting such movement to said shaft consisting of a gear-pinion on said shaft and a short shaft having two gear-pinions thereon one of which engages with said gear-pinion on said main shaft, and the other gear-pinion, and a constantly-rotating gear-disk having three sets of teeth adapted to engage with one side of said last-mentioned pinion and a fourth set adapted to engage with the other side of said pinion.

7. In a mechanical movement, the combination with a shaft mounted to rotate in suitable bearings, of a spider frictionally mounted thereon and having a plurality of equidistant arms, members movably mounted on the outer ends of said arms, and toggle-joint connections between said members and said shaft; substantially as and for the purpose described.

8. In a mechanical movement, a shaft mounted to rotate in suitable bearings, a pair of spiders frictionally mounted thereon each provided with the same number of equidistant arms, swinging members pivotally mounted between the outer ends of the opposed arms, locking mechanism to lock said spiders from movement at any position of adjustment, and toggle mechanism between each of said members and said shaft; substantially as and for the purpose described.

9. In a mechanical movement, a shaft mounted to rotate in suitable bearings, a pair of spiders frictionally mounted thereon each provided with the same number of equidistant arms, swinging members pivotally mounted between the outer ends of the opposed arms, locking mechanism to lock said spiders from movement at any position of adjustment, and toggle mechanism between each of said members and said shaft, said toggle mechanism consisting of a pair of collars secured on said shaft, and links connecting each of said collars and said members; substantially as and for the purpose described.

10. In a mechanical movement, the combination with a shaft mounted in bearings, of a frame frictionally mounted thereon, means for locking the frame against movement at each position of adjustment, a member pivotally mounted on the frame; and a toggle-joint connection between the shaft and member, the parts being arranged and constructed to operate as described.

In testimony whereof I affix my signature in presence of two witnesses.

CHARLES WILLIAMS.

Witnesses:
  E. MOLITOR,
  J. McROBERTS.